(12) United States Patent
Jian

(10) Patent No.: US 11,030,762 B2
(45) Date of Patent: Jun. 8, 2021

(54) METHOD AND APPARATUS FOR IMPROVING 3D IMAGE DEPTH INFORMATION AND UNMANNED AERIAL VEHICLE

(71) Applicant: AUTEL ROBOTICS CO., LTD., Guangdong (CN)

(72) Inventor: Yupeng Jian, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 16/793,931

(22) Filed: Feb. 18, 2020

(65) Prior Publication Data

US 2020/0184666 A1 Jun. 11, 2020

Related U.S. Application Data

(63) Continuation of application No. PCT/CN2018/084072, filed on Apr. 23, 2018.

(30) Foreign Application Priority Data

Aug. 18, 2017 (CN) .......................... 201710714161.0

(51) Int. Cl.
*G06T 7/593* (2017.01)
*B64C 39/02* (2006.01)
*B64D 47/08* (2006.01)

(52) U.S. Cl.
CPC ............ *G06T 7/593* (2017.01); *B64C 39/024* (2013.01); *B64D 47/08* (2013.01);
(Continued)

(58) Field of Classification Search
CPC .................................................. G06T 7/593
(Continued)

(56) References Cited

U.S. PATENT DOCUMENTS

| 9,594,381 | B1 * | 3/2017 | Clark | E04H 15/50 |
| 2016/0178734 | A1 * | 6/2016 | Kawamura | H04N 5/3535 356/5.01 |
| 2017/0070690 | A1 * | 3/2017 | Feder | H04N 5/378 |

FOREIGN PATENT DOCUMENTS

| CN | 104853080 A | 8/2015 |
| CN | 105894567 A | 8/2016 |

(Continued)

OTHER PUBLICATIONS

Extended European Search Report dated May 15, 2020; Appln. No. 18846940.7.

(Continued)

*Primary Examiner* — Shivang I Patel

(57) ABSTRACT

Implementations of the present invention disclose a method for improving 3D image depth information and an unmanned aerial vehicle. The method includes: acquiring a raw 3D image, performing first-time exposure on the raw 3D image, and generating a first exposure image; and if a quantity of effective pixel points in the first exposure image meets a preset condition, extracting the effective pixel point in the first exposure image; otherwise, continuously performing exposure on the raw 3D image and generating a corresponding exposure image, and determining whether the quantity of effective pixel points of the exposure image meets the preset condition until an exposure time reaches an exposure time threshold or a quantity of effective pixel points in the corresponding image generated through exposure meets the preset condition, and extracting the effective pixel point in the corresponding image; and demarcating and calibrating the effective pixel point, and generating a 3D depth information map.

11 Claims, 3 Drawing Sheets

(52) U.S. Cl.
CPC .. *B64C 2201/027* (2013.01); *B64C 2201/042* (2013.01); *B64C 2201/108* (2013.01); *B64C 2201/127* (2013.01); *G06T 2207/10144* (2013.01)

(58) Field of Classification Search
USPC .......................................................... 345/419
See application file for complete search history.

(56) References Cited

FOREIGN PATENT DOCUMENTS

| | | |
|---|---|---|
| CN | 106461763 A | 2/2017 |
| EP | 3015882 A1 | 5/2016 |
| WO | 2016171913 A1 | 10/2016 |

OTHER PUBLICATIONS

International Search Report dated Jun. 29, 2018; PCT/CN2018/084072.

* cited by examiner

METHOD AND APPARATUS FOR IMPROVING 3D IMAGE DEPTH INFORMATION AND UNMANNED AERIAL VEHICLE

This application is a continuation application of international Application No. PCT/CN2018/084072, filed on Apr. 23, 2018, which claims priority of Chinese Patent Application No. 201710714161.0, filed on Aug. 18, 2017, which is incorporated herein by reference in its entirety.

BACKGROUND

Technical Field

Implementations of the present invention relate to the technical field of unmanned aerial vehicles, and in particular, to a method and an apparatus for improving 3D image depth information and an unmanned aerial vehicle.

Related Art

During flight, an unmanned aerial vehicle (UAV) adopts a 3D depth camera to photograph a 3D image, acquires information about a depth of field in the 3D image, and determines a position of an obstacle according to the depth of field for ranging and obstacle avoidance. However, due to different depths of field in an image photographed by an existing 3D depth camera or poor reflectivity of a reflective surface, exposure effects of some pixel regions are not good, causing an incomplete picture or low confidence of local pixel points.

In the prior art, in a solution of resolving TOF ranging, the foregoing problems may be usually resolved by using a method of increasing an exposure time or a method of increasing illumination. TOF is an acronym of time of flight, and is translated into Fei Xing Shi Jain Chinese. Although through these methods, signal quality of a weakly reflective region may be improved to a certain extent, for a highly reflective region, saturation may occur and overexposure is produced. However, for a UAV area array obstacle avoidance application, overexposure may cause erroneous determining or missing detection of the obstacle, causing collisions between the UAV and an obstacle.

SUMMARY

In order to mainly resolve a technical problem, implementations of the present invention provide a method and an apparatus for improving 3D image depth information and an unmanned aerial vehicle (UAV), so that a problem in the prior art that a poor exposure effect of a photo photographed by a 3D depth camera causes poor image quality can be resolved.

To resolve the foregoing technical problem, a technical solution adopted in the implementations of the present invention is as follows. A method for improving 3D image depth information is provided, where the method includes:

acquiring a raw 3D image, performing first-time exposure on the raw 3D image, and generating a first exposure image;

acquiring an effective pixel point in the first exposure image, and if a quantity of effective pixel points meets a preset condition, extracting the effective pixel point in the first exposure image; otherwise, performing second-time exposure on the raw 3D image, and generating a second exposure image; and if a quantity of effective pixel points in the second exposure image meets a preset condition, extracting the effective pixel point in the second exposure image; otherwise, continuously performing exposure and generating a corresponding exposure image, determining whether the quantity of effective pixel points of the exposure image meets the preset condition until an exposure time reaches an exposure time threshold or a quantity of effective pixel points in the corresponding exposure image generated through exposure meets the preset condition, and extracting an effective pixel point in the exposure image; and demarcating and calibrating the effective pixel point, and generating a 3D depth information map.

Optionally, before the acquiring a raw 3D image, performing first-time exposure on the raw 3D image, and generating a first exposure image, the method further includes:

presetting an exposure time gradient array, the gradient array including exposure times with several time lengths arranged in ascending order, where an exposure time with the maximum time length is an exposure time threshold.

Optionally, the acquiring a raw 3D image, performing first-time exposure on the raw 3D image, and generating a first exposure image includes:

acquiring the raw 3D image, and acquiring one exposure time of the exposure time gradient array as a first exposure time; and performing the first-time exposure on the raw 3D image according to the first exposure time, and generating the exposure image.

Optionally, the performing second-time exposure on the raw 3D image, and generating a second exposure image includes:

if the quantity of effective pixel points in the first exposure image does not meet the preset condition, acquiring a second exposure time greater than the first exposure time and adjacent to the first exposure time in the exposure time gradient array, performing the second-time exposure on the raw 3D image, and generating the second exposure image.

Optionally, the continuously performing exposure and generating a corresponding exposure image until an exposure time reaches an exposure time threshold or a quantity of effective pixel points in the corresponding image generated through exposure meets the preset condition includes:

if the quantity of effective pixel points in the second exposure image does not meet the preset condition, acquiring a third exposure time greater than the second exposure time and adjacent to the second exposure time in the exposure time gradient array, performing third-time exposure on the raw 3D image, and generating the third exposure image until the exposure time reaches the exposure time threshold or the quantity of effective pixel points in the corresponding image generated through exposure meets the preset condition.

Optionally, the acquiring an effective pixel point in the first exposure image specifically includes:

acquiring the pixel point of the first exposure image, and determining whether the pixel point meets a preset signal quality parameter; and if the pixel point meets the preset signal quality parameter, marking the pixel point as an effective pixel point, and acquiring all effective pixel points in the first exposure image.

To resolve the foregoing technical problem, another technical solution adopted in the implementations of the present invention is as follows. An apparatus for improving 3D image depth information is provided. The apparatus includes a memory, a processor and a computer program stored in the memory and executable on the processor, when the computer program is executed by the processor, the foregoing steps being implemented:

acquiring a raw 3D image, performing first-time exposure on the raw 3D image, and generating a first exposure image;

acquiring an effective pixel point in the first exposure image, and if a quantity of effective pixel points meets a preset condition, extracting the effective pixel point in the first exposure image; otherwise, performing second-time exposure on the raw 3D image, and generating a second exposure image;

if a quantity of effective pixel points in the second exposure image meets the preset condition, extracting the effective pixel point in the second exposure image; otherwise, continuously performing exposure and generating a corresponding exposure image, determining whether the quantity of effective pixel points of the exposure image meets the preset condition until an exposure time reaches an exposure time threshold or a quantity of effective pixel points in the corresponding exposure image generated through exposure meets the preset condition, and extracting the effective pixel point in the exposure image; and demarcating and calibrating the effective pixel point, and generating a 3D depth information map.

Optionally, when the computer program is executed by the processor, the following steps being implemented:

presetting an exposure time gradient array, the gradient array including exposure times with several time lengths arranged in ascending order, where an exposure time with the maximum time length is an exposure time threshold.

Optionally, when the computer program is executed by the processor, the following steps being implemented:

acquiring the raw 3D image, and acquiring one exposure time of the exposure time gradient array as a first exposure time; and performing the first-time exposure on the raw 3D image according to the first exposure time, and generating the exposure image.

Optionally, when the computer program is executed by the processor, the following steps being implemented:

if the quantity of effective pixel points in the first exposure image does not meet the preset condition, acquiring a second exposure time greater than the first exposure time and adjacent to the first exposure time in the exposure time gradient array, performing the second-time exposure on the raw 3D image, and generating the second exposure image.

Optionally, when the computer program is executed by the processor, the following steps being implemented:

if the quantity of effective pixel points in the second exposure image does not meet the preset condition, acquiring a third exposure time greater than the second exposure time and adjacent to the second exposure time in the exposure time gradient array, performing third-time exposure on the raw 3D image, and generating the third exposure image until the exposure time reaches the exposure time threshold or the quantity of effective pixel points in the corresponding image generated through exposure meets the preset condition.

Optionally, when the computer program is executed by the processor, the following steps being implemented:

acquiring the pixel point of the first exposure image, and determining whether the pixel point meets a preset signal quality parameter; and if the pixel point meets the preset signal quality parameter, marking the pixel point as an effective pixel point, and acquiring all effective pixel points in the first exposure image.

To resolve the foregoing technical problem, another technical solution adopted in the implementations of the present invention is as follows. An unmanned aerial vehicle 3D is provided, including:

a housing;

an arm;

a motor mounted onto the arm;

a propeller including a hub and a blade, the hub being connected to a rotating shaft of the motor, when the rotating shaft of the motor rotates, the blade being driven to rotate to produce a force that causes the UAV to move;

a camera mounted onto the housing; and a processor configured to perform the method for improving the 3D image depth information.

Another implementation of the present invention provides a computer program product that includes a computer program stored in a non-volatile computer readable storage medium, the computer program including a program instruction that, when executed by a processor, causes the processor to perform the foregoing method for improving the 3D image depth information.

Another implementation of the present invention provides a non-volatile computer readable storage medium storing a computer executable instruction that, when executed by one or more processors, may cause the one or more processors to perform the foregoing method for improving the 3D image depth information.

The implementations of the present invention provide the method and apparatus for improving the 3D image depth information and the UAV. Exposure is performed on the image photographed by the 3D camera for a plurality of times, and after the effective pixel points in the exposure image that meet the preset condition are extracted, demarcated and calibrated, the 3D depth image is generated. Different from the prior art, according to the implementations of the present invention, quality of the 3D depth image can be effectively improved, thereby better restoring a real 3D scene, and providing convenience for the UAV to avoid obstacles.

BRIEF DESCRIPTION OF THE DRAWINGS

In order to more clearly illustrate the technical solutions of the embodiments of the present application, the accompanying drawings that need to be used in the embodiments of the present application will be briefly introduced below. Obviously, the accompanying drawings described below are only some embodiments of the present application. For a person of ordinary skill in the art, other accompanying drawings can be obtained based on these accompanying drawings without creative efforts.

DETAILED DESCRIPTION

Figure 1:
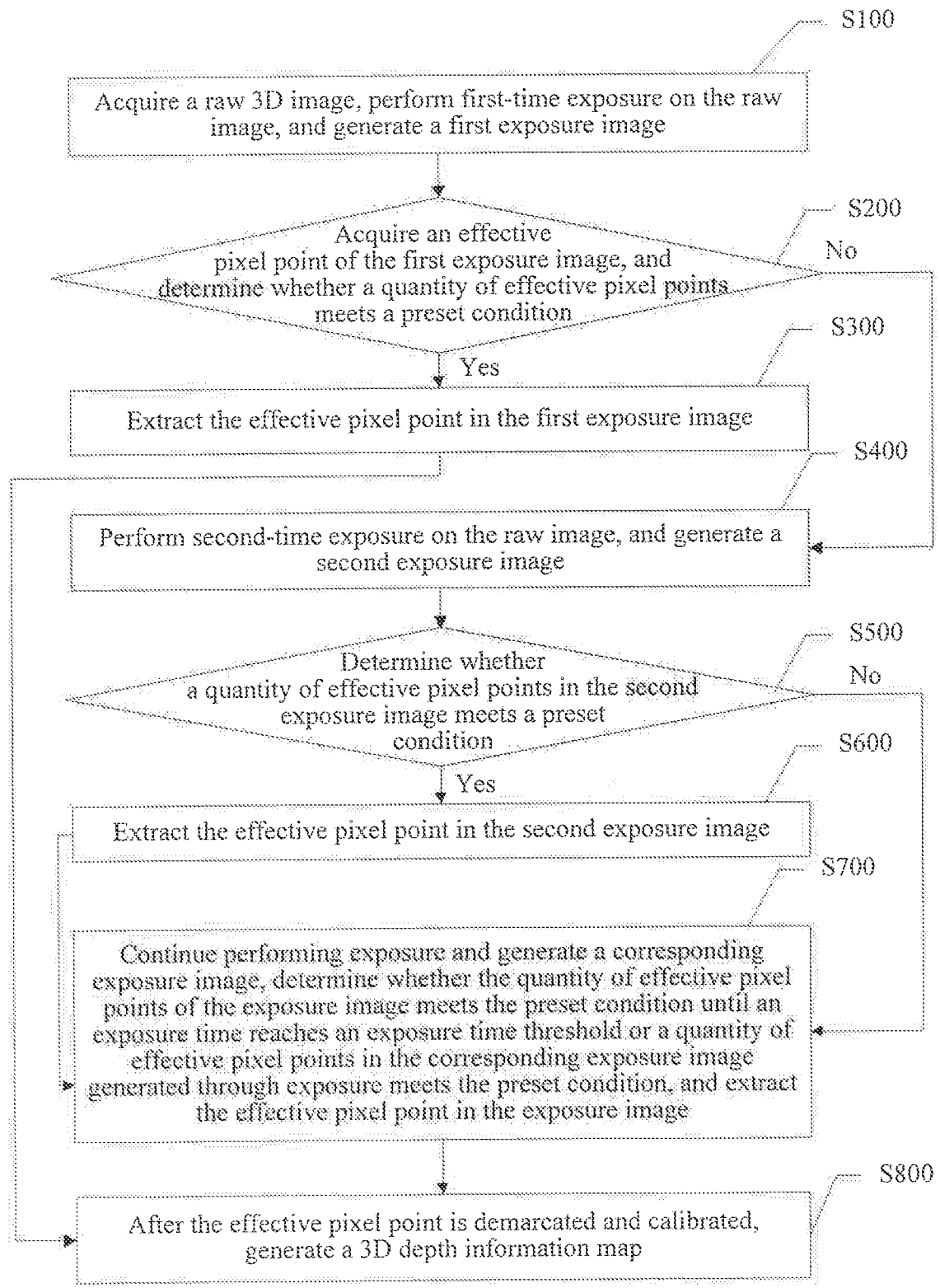
FIG. 1 is a schematic flowchart of a method for improving 3D image depth information according to an embodiment of the present invention.

In order to make the objectives, technical solutions, and advantages of the present invention clearer, the present invention is further described in detail below with reference to the accompanying drawings and embodiments. It should be understood that the specific embodiments described herein are only used to explain the present invention and are not intended to limit the present invention.

During image photographing, a 3D camera of an existing unmanned aerial vehicle (UAV) usually adopts single exposure. The single exposure leads to lack of exposure or weak reflection on pixel points in some regions of 3D depth information in one frame, causing erroneous determining of distance information, and causing inconvenience to safe flight of the UAV.

In a flight process, the UAV needs to acquire a distance between the UAV and an obstacle in real time. The UAV photographs a raw 3D image through a 3D camera for exposure. Because quality of the exposure image directly affects generation of a 3D depth information map, during single exposure, a signal of the image may be excessively weak or excessively strong. An excessively weak signal of a corresponding image represents an excessively weak reflection signal, and an excessively strong signal of an image leads to excessively strong reflection light, so that a final 3D depth information map is affected.

In the embodiments of the present invention, the 3D camera herein refers to an apparatus for measuring a depth of field based on a TOF technology. A generated image is a distance between a transmission point and a reflection point, and different colors represent different distances, reflecting 3D depth information of a scene at different levels. The 3D camera acquires information about the depth of field in the 3D image by adopting the TOF technology, and determines a position of an obstacle according to the depth of field, thereby avoiding the obstacle. TOF is an acronym of time of flight (TOF) technologies. A sensor transmits a modulated near infrared light or laser, and the light is reflected after encountering an object, so that a time difference or a phase difference between light transmission and reflection is calculated to convert a distance from a captured scenery to produce depth distance information.

Therefore, a raw 3D image needs to be acquired, first-time exposure is performed on the raw 3D image, and the first exposure image is generated. If a quantity of effective pixel points in the first exposure image meets a preset condition, the effective pixel point in the first exposure image is extracted, the effective pixel point is demarcated and extracted, and a 3D depth information map is generated. The preset condition includes, but is not limited to the quantity of thresholds of the effective pixel points. An exposure time of the first-time exposure is recorded as a first exposure time.

If the quantity of effective pixel points in the first exposure image does not meet the preset condition, second-time exposure is performed on the photographed raw 3D image, and a second exposure image is generated, where a second-time exposure time is longer than the first exposure time.

If a quantity of effective pixel points in the second exposure image meets a preset condition, the effective pixel point in the second exposure image is extracted, the effective pixel point is demarcated and calibrated, and a 3D depth information map is generated.

If the quantity of effective pixel points in the second exposure image does not meet the preset condition, exposure is continuously performed and a corresponding exposure image is generated. A last exposure time is longer than a previous exposure time, and exposure is continuously performed until an exposure time reaches a preset exposure time threshold or a quantity of effective pixel points in the corresponding image generated through exposure meets the preset condition. In this case, the effective pixel point in the corresponding image is extracted, the effective pixel point is demarcated and extracted, and a 3D depth information map is generated, thereby acquiring an effective pixel point that most meets the condition in the exposure image during exposure for a plurality of times for demarcation and calibration, effectively improving quality of the 3D depth image and better restoring a real 3D scene.

Referring to FIG. 1, FIG. 1 is a schematic flowchart of a method for improving 3D image depth information according to an embodiment of the present invention. This implementation includes the following steps.

Step S100: A raw 3D image is acquired, first-time exposure is performed on the raw 3D image, and a first exposure image is generated.

During specific implementation, in a flight process, an unmanned aerial vehicle (UAV) records a real-time video through a 3D camera, and acquires a 3D depth image after processing each frame of image in the video, to determine a distance between the UAV and an obstacle. The raw 3D image is acquired, the first-time exposure is performed on the raw 3D image, where an exposure time of the first-time exposure may be preset by a user, and the first exposure image generated in the first-time exposure is acquired.

Step S200: An effective pixel point of the first exposure image is acquired, and it is determined whether a quantity of effective pixel points meets a preset condition, if so, step S300 is performed; and if not, step S400 is performed.

If the quantity of effective pixel points meets the preset condition, the effective pixel point in the first exposure image is extracted; otherwise, second-time exposure is performed on the raw 3D image, and a second exposure image is generated.

During specific implementation, the first exposure image acquired in step S100 is acquired, and the effective pixel point in the first exposure image is acquired, where the effective pixel point refers to a pixel point that meets a preset signal quality parameter. The signal quality parameter includes, but is not limited to a signal amplitude and a signal-to-noise ratio. The preset signal quality parameter may be a preset signal amplitude interval, or a preset signal-to-noise ratio interval.

Step S300: If the quantity of effective pixel points meets the preset condition, the effective pixel point in the first exposure image is extracted.

During specific implementation, if the quantity of effective pixel points in the first exposure image meets the preset condition, the preset condition includes, but is not limited to a threshold of the quantity of the effective pixel points. For example, if the quantity of effective pixel points in the first exposure image meets a preset threshold of the quality of effective pixel points, the effective pixel point in the first exposure image is extracted.

Step S400: If the quantity of effective pixel points does not meet the preset condition, second-time exposure is performed on the raw 3D image, and a second exposure image is generated.

During specific implementation, if the quantity of effective pixel points in the first exposure image does not meet the preset threshold of the quality of effective pixel points, second-time exposure is performed on the raw 3D image. A second-time exposure time is different from a first-time exposure time. Preferably, the second-time exposure time is longer than the first-time exposure time, and a second exposure image generated in the second-time exposure is acquired.

Step S500: It is determined whether a quantity of effective pixel points in the second exposure image meets a preset condition, if so, step S600 is performed; and if not, step S700 is performed.

Step S600: If the quantity of effective pixel points in the second exposure image meets the preset condition, the effective pixel point in the second exposure image is extracted.

During specific implementation, the second exposure image in step S400 is acquired. If the quantity of effective pixel points in the second exposure image meets the preset condition, the effective pixel point in the second exposure image is extracted.

Step S700: If the quantity of effective pixel points in the second exposure image does not meet the preset condition, exposure is continuously performed and a corresponding exposure image is generated, and it is determined whether the quantity of effective pixel points of the exposure image meets the preset condition until an exposure time reaches an exposure time threshold, or a quantity of effective pixel points in the corresponding exposure image generated through exposure meets the preset condition, the effective pixel point in the exposure image is extracted.

During specific implementation, if the quantity of effective pixel points in the second exposure image does not meet the preset condition, the exposure is continuously performed and the corresponding exposure image is generated. In this case, it is determined whether the quantity of effective pixel points of the exposure image meets the preset condition until the exposure time reaches the exposure time threshold or the quantity of effective pixel points in the corresponding exposure image generated through exposure meets the preset condition, the effective pixel point in the corresponding exposure image is extracted.

The preset condition is that the quality of effective pixel points generated through exposure exceeds a certain trigger quantity, or the quantity of effective pixel points generated through exposure is equal to a quantity of pixel points of the image. The trigger quantity is a quantity of preset thresholds, the trigger quantity being less than the quantity of pixel points of the exposure image. For example, if the quantity of pixel points in the exposure image is 200 and the trigger quantity is 180, it is detected that the quantity of effective pixel points generated through exposure exceeds 180. In this case, it indicates that the effective pixel points in the exposure image meet the preset condition.

Step S800: After the effective pixel point is demarcated and calibrated, a 3D depth information map is generated.

During specific implementation, the effective pixel points that are extracted in step S300, step S600 and step S700 are sequentially demarcated and calibrated, and a 3D depth information map of high quality is generated. A demarcation and calibration method is specifically performed according to a parameter of the 3D camera.

Optionally, before step S100, the method further includes the following steps.

Step S10: An exposure time gradient array is preset, the gradient array including exposure times with several time lengths arranged in ascending order, where an exposure time with the maximum time length is an exposure time threshold.

During specific implementation, if the exposure time is too long, an exposure time is extended indefinitely after the 3D camera photographs an image, and the pixel point cannot be demarcated and calibrated, causing inconvenience to the UAV for acquiring the 3D depth information map in real time. If the exposure time is shorter, most pixels in the image are not exposed enough, which is likely to cause erroneous determining of distance information. Therefore, it is necessary to preset the exposure time gradient array to ensure quality of the exposure image without prolonging an acquisition time of the 3D depth information map. The exposure time gradient array is a gradient array with known time lengths arranged in ascending order. After each exposure is performed, it is determined, depending on whether the quantity of effective pixel points meets the preset condition, whether next exposure is performed, and if not, a next larger gradient value in the exposure time gradient array is selected as the exposure time.

Optionally, step S100 includes:

Step S101: The raw 3D image is acquired, and one exposure time of the exposure time gradient array is acquired as a first exposure time.

Step S102: The first-time exposure is performed on the raw 3D image according to the first exposure time, and the first exposure image is generated.

During specific implementation, the 3D camera photographs a raw 3D image, and acquires the exposure time in a pre-tuned exposure time gradient array as the first exposure time Preferably, the exposure time with a minimum time length in the exposure time gradient array is used as the first exposure time. The first-time exposure is performed on the acquired raw 3D image according to the first exposure time, and the first exposure image is generated.

Optionally, step S400 includes the following steps.

If the quantity of effective pixel points in the first exposure image does not meet the preset condition, a second exposure time greater than the first exposure time and adjacent to the first exposure time in the exposure time gradient array is obtained, the second-time exposure is performed on the raw 3D image, and the second exposure image is generated.

During specific implementation, if the quantity of effective pixel points in the first exposure image does not meet the preset condition, the second exposure time greater than the first exposure time and adjacent to the first exposure time in the exposure time gradient array is acquired, the second-time exposure is performed on the raw 3D image according to the second exposure time, and the second exposure image is generated, where the second exposure time is a next gradient array of the first exposure time in the exposure time gradient array.

Optionally, in step S700, that exposure is continuously performed and a corresponding exposure image is generated until an exposure time reaches an exposure time threshold or a quantity of effective pixel points in the corresponding image generated through exposure meets the preset condition specifically includes the following steps.

If the quantity of effective pixel points in the second exposure image does not meet the preset condition, a third exposure time greater than the second exposure time and adjacent to the second exposure time in the exposure time gradient array is acquired, third-time exposure is performed on the raw 3D image, and the third exposure image is generated until the exposure time reaches the exposure time threshold or the quantity of effective pixel points in the corresponding image generated through exposure meets the preset condition.

During specific implementation, if the quantity of effective pixel points in the second exposure image does not meet the preset condition, the third exposure time greater than the second exposure time and adjacent to the second exposure time in the exposure time gradient array is obtained, the third-time exposure is performed on the raw 3D image, and the third exposure image is generated. If the third exposure time is an exposure time threshold in the exposure time gradient array, regardless of whether an effective pixel point marked in the third exposure image meets the preset condition, acquisition of the effective pixel point ends, and the effective pixel point in the third exposure image is extracted.

Figure 2:
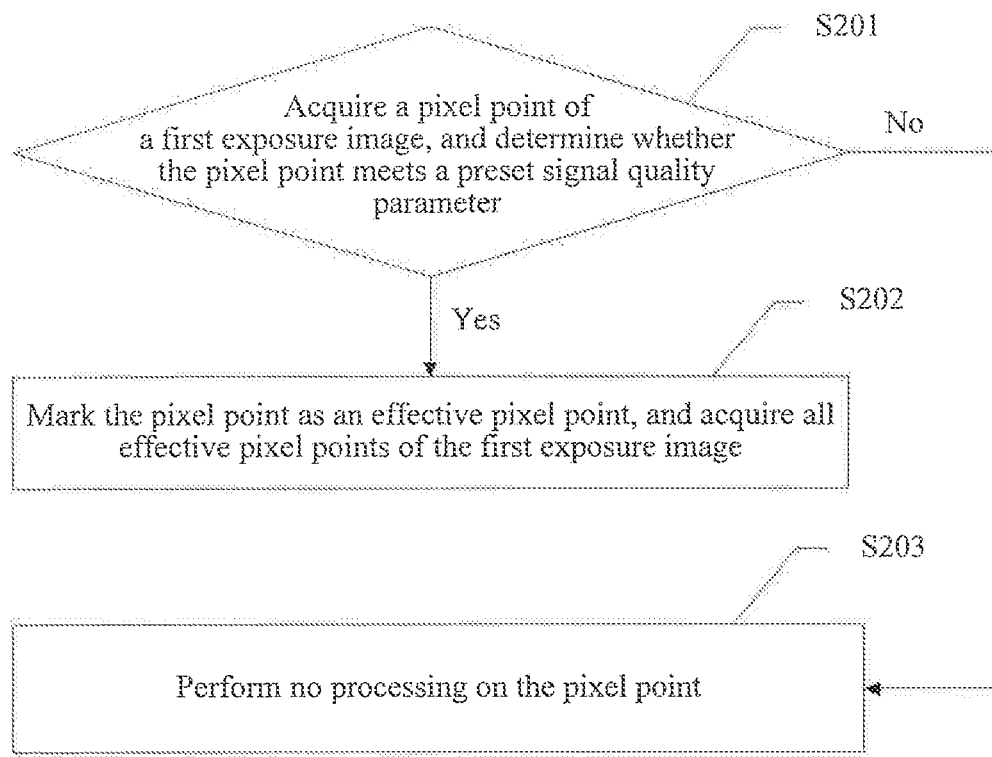
FIG. 2 is a schematic flowchart of a method for acquiring an effective pixel point of a method for improving 3D image depth information according to still another embodiment of the present invention.

Referring to FIG. 2, FIG. 2 is a schematic flowchart of a method for acquiring an effective pixel point of a method firer improving 3D image depth information according to another embodiment of the present invention. As shown in FIG. 2, that the effective pixel point in the first exposure image is acquired in step S200 includes the following steps.

Step S201: The pixel point of the first exposure image is acquired, and it is determined whether the pixel point meets a preset signal quality parameter.

Step S202: If the pixel point meets the preset signal quality parameter, the pixel point is marked as an effective pixel point, and all effective pixel points of the first exposure image are acquired.

Step S203: Any processing is not performed on the pixel point.

During specific implementation, all pixel points of the first exposure image are acquired, and it is sequentially determined whether a signal quality parameter of each pixel point meets the preset signal quality parameter. If the signal quality parameter of the pixel point meets the preset signal quality parameter, the pixel point is marked as an effective pixel point, all pixel points in the first exposure image are marked according to this principle, and all the effective pixel points marked in the first exposure image are acquired. If the signal quality parameter of the pixel point does not meet the preset signal quality parameter, any processing is not performed on the pixel point.

The signal quality parameter includes, but is not limited to a signal amplitude and a signal-to-noise ratio. In this implementation, the signal amplitude is used as an example for description. The signal amplitude is agreed as follows: if the signal amplitude is marked as amp, amp<100, it indicates that the reflected signal is too weak and is unreliable data that should be discarded; or if amp>100 and amp<1000, it indicates that the signal is normal and effective data; and if amp>1000, it indicates that the pixel is a saturation pixel and is ineffective data that should be discarded. Therefore, it is determined whether the pixel point is effective, that is, it is determined whether the signal amplitude of the pixel point is between 100 and 1000.

Figure 3:
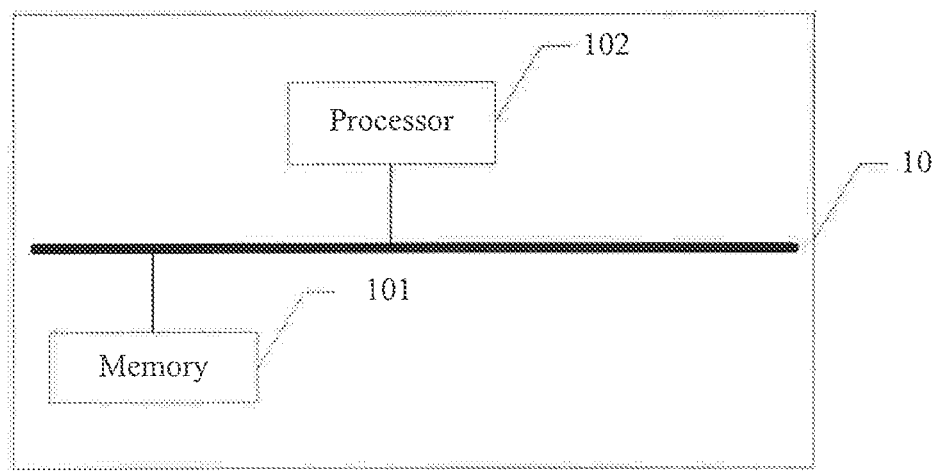
FIG. 3 is a structural diagram of hardware of an apparatus for improving 3D image depth information according to still another embodiment of the present invention.

Referring to FIG. 3, FIG. 3 is a structural diagram of hardware of an apparatus for improving 3D image depth information according to an embodiment of the present invention.

In this embodiment, the apparatus 10 for improving the 3D image depth information includes a memory 101 and a processor 102. The apparatus 10 for improving the 3D image depth information may be an independent electronic apparatus for processing a 3D image, for example, a photographing device such as a 3D camera, or may be an accessory apparatus attached to or coordinated with a photographing device such as a camera for achieving 3D image processing, such as an electronic device provided with a 3D camera or a UAV provided with a 3D camera. The memory 101 includes at least one type of readable storage medium, which includes a flash memory, a hard disk, a multimedia card, a card-type memory (for example, an SD, DX memory or the like), a random access memory (RAM, a static random access memory (SRAM), a read-only memory (ROM), an electrically erasable programmable read-only memory (EEPROM), a programmable read-only memory (PROM), a magnetic memory, a disk, disc, etc. The processor 102 may be a central processing unit (CPU), a controller, a microcontroller, a microprocessor, other data processing chips, or the like.

Figure 4:
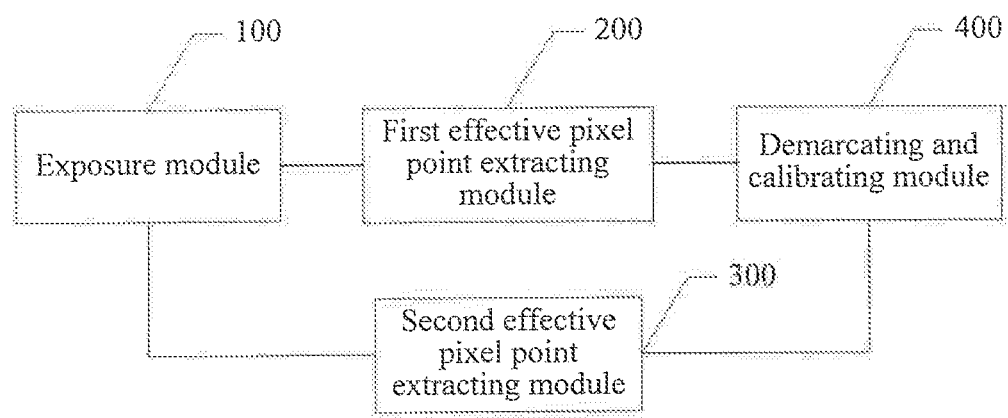
FIG. 4 is a schematic diagram of a program module of an apparatus for improving 3D image depth information according to an embodiment of the present invention.

Referring to FIG. 4, FIG. 4 is a schematic diagram of a program module of an apparatus for improving 3D image depth information according to still another embodiment of the present invention.

The apparatus 10 for improving the 3D image depth information includes an exposure module 100, a first effective pixel point extracting module 200, a second effective pixel point extracting module 300, and a demarcating and calibrating module 400. The module is configured to be executed by one or more processors (in this embodiment, the processor is a processor 102) to complete the present invention. The module in the present invention is a computer program segment that completes a specific function. The memory 101 is configured to store data such as program code of the apparatus 10 for improving the 3D image depth information. The processor 102 is configured to execute the program code stored in the memory 101.

The functions implemented by each program module are described in detail below.

The exposure module 100 is configured to: acquire a raw 3D image, perform first-time exposure on the raw 3D image, and generate a first exposure image.

The first effective pixel point extracting module 200 is configured to: acquire an effective pixel point in the first exposure image, and if a quantity of effective pixel points meets a preset condition, extract the effective pixel point in the first exposure image; otherwise, perform second-time exposure on the raw 3D image, and generate a second exposure image.

The second effective pixel point extracting module 300 is configured to: if a quantity of effective pixel points in the second exposure image meets a preset condition, extract the effective pixel point in the second exposure image; otherwise, continuously perform exposure and generate a corresponding exposure image, determine whether the quantity of effective pixel points of the exposure image meets the preset condition until an exposure time reaches an exposure time threshold or a quantity of effective pixel points in the corresponding exposure image generated through exposure meets the preset condition, and extract the effective pixel point in the exposure image.

The demarcating and calibrating module 400 is configured to demarcate and calibrate the effective pixel point, and generate a 3D depth information map.

During specific implementation, for example, in a flight process, an unmanned aerial vehicle (UAV) records a real-time video through a 3D camera, and needs to acquire a 3D depth image after processing each frame of image in the video, to determine a distance between the UAV and an obstacle. The exposure module 100 is configured to: acquire the raw 3D image, perform the first-time exposure on the raw 3D image, where an exposure time of the first-time exposure may be preset by a user, and acquire the first exposure image generated in the first-time exposure.

The first effective pixel point extracting module 200 is configured to: acquire the first exposure image acquired from the exposure module 100, and acquire an effective pixel point in the first exposure image, where the effective pixel point refers to a pixel point that meets a preset signal quality parameter. The signal quality parameter includes, but is not limited to a signal amplitude and a signal-to-noise ratio. The preset signal quality parameter may be a preset signal amplitude interval, or a preset signal-to-noise ratio interval.

If the quantity of effective pixel points in the first exposure image meets the preset condition, the preset condition includes, but is not limited to a threshold of the quantity of the effective pixel points. For example, if the quantity of effective pixel points in the first exposure image meets a preset threshold of the quality of effective pixel points, the effective pixel point in the first exposure image is extracted.

If the quantity of effective pixel points in the first exposure image does not meet the preset threshold of the quality of effective pixel points, second-time exposure is performed on the raw 3D image. A second-time exposure time is different from a first-time exposure time. Preferably, the second-time exposure time is longer than the first-time exposure time, and a second exposure image generated in the second-time exposure is acquired.

The second effective pixel point extracting module 300 is configured to: acquire the second exposure image in the first effective pixel point extracting module 200, and if a quantity of effective pixel points in the second exposure image meets a preset condition, extract the effective pixel point in the second exposure image;

if the quantity of effective pixel points in the second exposure image does not meet the preset condition, continuously perform exposure and generate a corresponding exposure image, in this case, continuously determine whether the quantity of effective pixel points of the exposure image meets the preset condition until an exposure time reaches an exposure time threshold or a quantity of effective pixel points in the corresponding exposure image generated through exposure meets the preset condition, and extract the effective pixel point in the corresponding exposure image.

The preset condition is that the quality of effective pixel points generated through exposure exceeds a certain trigger quantity, or the quantity of effective pixel points generated through exposure is equal to a quantity of pixel points of the image. The trigger quantity is a quantity of preset thresholds, the trigger quantity being less than the quantity of pixel points of the exposure image. For example, if the quantity of pixel points in the exposure image is 200 and the trigger quantity is 180, it is detected that the quantity of effective pixel points generated through exposure exceeds 180. In this case, it indicates that the effective pixel points in the exposure image meet the preset condition.

The demarcating and calibrating module 400 is configured to sequentially demarcate and calibrate the effective pixel points, and generate a 3D depth information map of high quality. A demarcation and calibration method is specifically performed according to a parameter of the 3D camera.

Optionally, the apparatus further includes:
a preset module configured to preset an exposure time gradient array, the gradient array including exposure times with several time lengths arranged in ascending order, where an exposure time with the maximum time length is the exposure time threshold.

During specific implementation, if the exposure time is too long, an exposure time is extended indefinitely after the 3D camera photographs an image, and the pixel point cannot be demarcated and calibrated, causing inconvenience to the UAV for acquiring the 3D depth information map in real time. If the exposure time is shorter, most pixels in the image are not exposed enough, which is likely to cause erroneous determining of distance information. Therefore, it is necessary to preset the exposure time gradient array to ensure quality of the exposure image without prolonging an acquisition time of the 3D depth information map. The preset module is configured to preset an exposure time gradient array, the exposure time gradient array being a gradient array with known time lengths, and time lengths being arranged in ascending order. After each exposure is performed, it is determined, depending on whether the quantity of effective pixel points meets the preset condition, whether next exposure is performed, and if not, a next larger gradient value in the exposure time gradient array is selected as the exposure time.

Optionally, the exposure module 100 is further configured to:
acquire the raw 3D image, and acquire one exposure time of an exposure time gradient array as a first exposure time; and
perform the first-time exposure on the raw 3D image according to the first exposure time, and generate the first exposure image.

During specific implementation, the exposure module 100 is further configured to:
after the 3D camera photographs a raw 3D image, acquire the exposure time in a pre-tuned exposure time gradient array as the first exposure time. Preferably, the exposure time with a minimum time length in the exposure time gradient array is used as the first exposure time. The first-time exposure is performed on the acquired raw 3D image according to the first exposure time, and the first exposure image is generated.

Optionally, the first effective pixel point extracting module 200 is further configured to:
if the quantity of effective pixel points in the first exposure image does not meet the preset condition, acquire a second exposure time greater than the first exposure time and adjacent to the first exposure time in the exposure time gradient array, perform the second-time exposure on the raw 3D image, and generate the second exposure image.

During specific implementation, the first effective pixel point extracting module 200 is further configured to: if the quantity of effective pixel points m the first exposure image does not meet the preset condition, acquire the second exposure time greater than the first exposure time and adjacent to the first exposure time in the exposure time gradient array, perform the second-time exposure on the raw 3D image according to the second exposure time, and generate the second exposure image, where the second exposure time is a next gradient array of the first exposure time in the exposure time gradient array.

Optionally, the second effective pixel point extracting module 300 is further configured to:
If the quantity of effective pixel points in the second exposure image does not meet the preset condition, acquire a third exposure time greater than the second exposure time and adjacent to the second exposure time in the exposure time gradient array, perform third-time exposure on the raw 3D image, and generate the third exposure image until the exposure time reaches the exposure time threshold or the quantity of effective pixel points in the corresponding image generated through exposure meets the preset condition.

During specific implementation, the second effective pixel point extracting module 300 is further configured to: if the quantity of effective pixel points in the second exposure image does not meet the preset condition, acquire the third exposure time greater than the second exposure time and adjacent to the second exposure time in the exposure time gradient array, perform the third-time exposure on the raw 3D image, and generate the third exposure image, if the third exposure time is an exposure time threshold in the exposure time gradient array, regardless of whether an effective pixel point marked in the third exposure image meets the preset condition, acquisition of the effective pixel point ends, and the effective pixel point in the third exposure image is extracted.

Optionally, the first effective pixel point extracting module 200 is further configured to:

acquire the pixel point of the first exposure image, and determine whether the pixel point meets a preset signal quality parameter; and if the pixel point meets the preset signal quality parameter, mark the pixel point as an effective pixel point, and acquire all effective pixel points in the first exposure image.

During specific implementation, the first effective pixel point extracting module 200 is further configured to: acquire the pixel point of the first exposure image, and determine whether a signal quality parameter of the pixel point meets the preset signal quality parameter, if the signal quality parameter of the pixel point meets the preset signal quality parameter, mark the pixel point as an effective pixel point, mark all pixel points in the first exposure image according to this principle, and acquire all the effective pixel points in the first exposure image.

The signal quality parameter includes, but is not limited to a signal amplitude and a signal-to-noise ratio. In this implementation, the signal amplitude is used as an example for description. The signal amplitude is agreed as follows: if the signal amplitude is marked as amp, amp<100, it indicates that the reflected signal is too weak and is unreliable data that should be discarded; or if amp>100 and amp<1000, it indicates that the signal is normal and effective data; and if amp>1000, it indicates that the pixel is a saturation pixel and is ineffective data that should be discarded. Therefore, it is determined whether the pixel point is effective, that is, it is determined whether the signal amplitude of the pixel point is between 100 and 1000.

Figure 5:
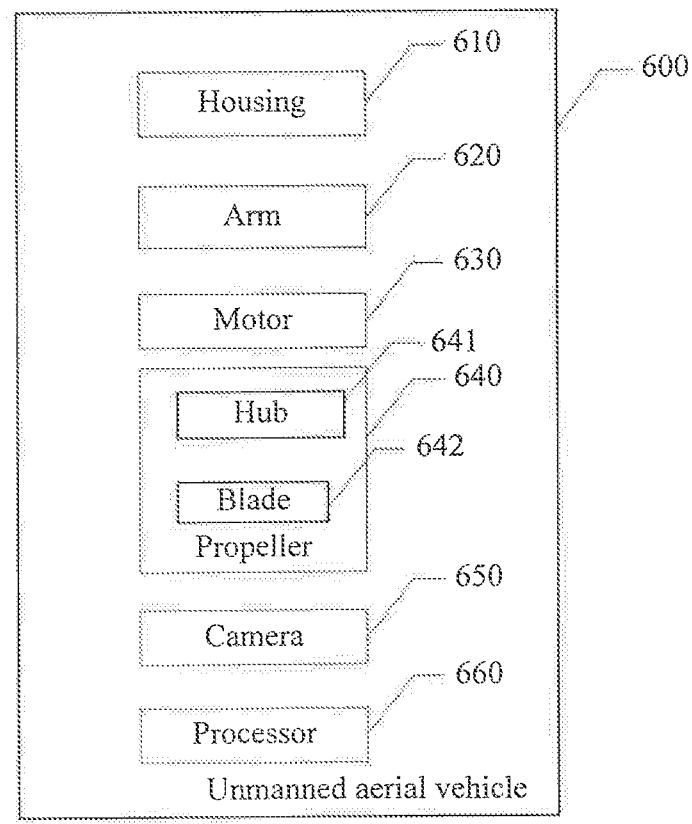
FIG. 5 is a structural block diagram of an unmanned aerial vehicle according to another embodiment of the present invention.

As shown in FIG. 5, another embodiment of the present invention provides an unmanned aerial vehicle (UAV) 600. The UAV 600 includes a housing 610, an arm 620, a motor 630 mounted onto the arm 620; a propeller 640 including a hub 641 and a blade 642, the hub 641 being connected to a rotating shaft of the motor 630, when the rotating shaft of the motor 630 rotates, the blade 642 being driven to rotate to produce a force that causes the UAV 600 to move; a camera 650 mounted onto the housing 610; and a processor 660 configured to perform step S100 to step S800 in the method in FIG. 1, step S201 to step S203 in the method in FIG. 2, and implement functions of the modules 100-400 in FIG. 4.

An embodiment of the present invention provides a non-volatile computer readable storage medium storing a computer executable instruction that, when executed by one or more processors, causes the processor to perform, for example, step S100 to step S800 in the method in FIG. 1, step S201 to step S203 in the method in FIG. 2, and implement functions of the modules 100-400 in FIG. 4.

Another embodiment of the present invention provides a computer program product that includes a computer program stored in a non-volatile computer readable storage medium, the computer program including a program instruction that, when executed by a processor, causes the processor to perform the foregoing method for improving the 3D image depth information, for example, perform step S100 to step S800 in the method in FIG. 1, step S201 to step S203 in the method in FIG. 2, and implement functions of the modules 100-400 in FIG. 4.

The apparatus embodiment described above is merely exemplary, and the modules described as separate components may or may not be physically separate, the components displayed as units may or may not be physical units, that is, may be located in one place, or may be distributed on a plurality of network units. Part or all of the modules may be selected according to actual needs to achieve the objective of the solution of this embodiment.

Through the description of the above embodiments, a person skilled in the art can clearly understand that the embodiments can be implemented by means of software plus a general hardware platform, and certainly, can also be implemented by hardware. Based on such an understanding, the above-mentioned technical solution in essence or the part that contributes to the related technology can be embodied in the form of a software product, which can exist in a computer-readable storage medium, such as ROM/RAM, magnetic disk. An optical disc, and the like, including a number of instructions for causing a computer device (which may be a personal computer, a server, or a network device, etc.) to perform the methods described in various embodiments or certain parts of the embodiments.

The above description is only an embodiment of the present invention, and thus does not limit the scope of the patent of the present invention. Any equivalent structure or equivalent process transformation made by using the description and accompanying drawings of the present invention, or directly or indirectly applied to other related technologies. The same applies to the scope of patent protection of the present invention

What is claimed is:

1. A method for improving 3D image depth information, wherein the method comprises:

acquiring a raw 3D image, performing first-time exposure on the raw 3D image, and generating a first exposure image;

acquiring an effective pixel point in the first exposure image, and if a quantity of effective pixel points meets a preset condition, extracting the effective pixel point in the first exposure image; otherwise, performing second-time exposure on the raw 3D image, and generating a second exposure image; and if a quantity of effective pixel points in the second exposure image meets a preset condition, extracting the effective pixel point in the second exposure image; otherwise, continuously performing exposure and generating a corresponding exposure image, determining whether the quantity of effective pixel points of the exposure image meets the preset condition until an exposure time reaches an exposure time threshold or a quantity of effective pixel points in the corresponding exposure image generated through exposure meets the preset condition, and extracting an effective pixel point in the exposure image; and demarcating and calibrating the effective pixel point, and generating a 3D depth information map;
wherein the acquiring an effective pixel point in the first exposure image specifically comprises:
acquiring the pixel point of the first exposure image, and determining whether the pixel point meets a preset signal quality parameter; and
if the pixel point meets the preset signal quality parameter, marking the pixel point as an effective pixel point, and acquiring all effective pixel points in the first exposure image.

2. The method for improving the 3D image depth information according to claim 1, before the acquiring a raw 3D image, performing first-time exposure on the raw 3D image, and generating a first exposure image, further comprising:
presetting an exposure time gradient array, the gradient array comprising exposure times with several time lengths arranged in ascending order, wherein an exposure time with the maximum time length is an exposure time threshold.

3. The method for improving the 3D image depth information according to claim 2, wherein the acquiring a raw 3D image, performing first-time exposure on the raw 3D image, and generating a first exposure image comprises:
acquiring the raw 3D image, and acquiring one exposure time of the exposure time gradient array as a first exposure time; and
performing the first-time exposure on the raw 3D image according to the first exposure time, and generating the first exposure image.

4. The method for improving the 3D image depth information according to claim 3, wherein the performing second-time exposure on the raw 3D image, and generating a second exposure image comprises:
if the quantity of effective pixel points in the first exposure image does not meet the preset condition, acquiring a second exposure time greater than the first exposure time and adjacent to the first exposure time in the exposure time gradient array, performing the second-time exposure on the raw 3D image, and generating the second exposure image.

5. The method for improving the 3D image depth information according to claim 4, wherein the performing exposure and generating a corresponding exposure image until an exposure time reaches an exposure time threshold or a quantity of effective pixel points in the corresponding image generated through exposure meets the preset condition comprises:
if the quantity of effective pixel points in the second exposure image does not meet the preset condition, acquiring a third exposure time greater than the second exposure time and adjacent to the second exposure time in the exposure time gradient array, performing third-time exposure on the raw 3D image, and generating the third exposure image until the exposure time reaches the exposure time threshold or the quantity of effective pixel points in the corresponding image generated through exposure meets the preset condition.

6. An apparatus for improving 3D image depth information, characterized in that the apparatus comprising: a memory, a processor and a computer program stored in the memory and executable on the processor, when the computer program is executed by the processor, the foregoing steps being implemented:
acquiring a raw 3D image, performing first-time exposure on the raw 3D image, and generating a first exposure image;
acquiring an effective pixel point in the first exposure image, and if a quantity of effective pixel points meets a preset condition, extracting the effective pixel point in the first exposure image; otherwise, performing second-time exposure on the raw 3D image, and generating a second exposure image; and
if a quantity of effective pixel points in the second exposure image meets the preset condition, extracting the effective pixel point in the second exposure image; otherwise, continuously performing exposure and generating a corresponding exposure image, determining whether the quantity of effective pixel points of the exposure image meets the preset condition until an exposure time reaches an exposure time threshold or a quantity of effective pixel points in the corresponding exposure image generated through exposure meets the preset condition, and extracting the effective pixel point in the exposure image; and
demarcating and calibrating the effective pixel point, and generating a 3D depth information map;
wherein when the computer program is executed by the processor, the following steps being implemented:
acquiring the pixel point of the first exposure image, and determining whether the pixel point meets a preset signal quality parameter; and
if the pixel point meets the preset signal quality parameter, marking the pixel point as an effective pixel point, and acquiring all effective pixel points in the first exposure image.

7. The apparatus for improving the 3D image depth information according to claim 6, wherein when the computer program is executed by the processor, the following steps being implemented:
presetting an exposure time gradient array, the gradient array comprising exposure times with several time lengths arranged in ascending order, wherein an exposure time with the maximum time length is an exposure time threshold.

8. The apparatus for improving the 3D image depth information according to claim 7, wherein when the computer program is executed by the processor, the following steps being implemented:
acquiring the raw 3D image, and acquiring one exposure time of the exposure time gradient array as a first exposure time; and
performing the first-time exposure on the raw 3D image according to the first exposure time, and generating the first exposure image.

9. The apparatus for improving the 3D image depth information according to claim 8, wherein when the computer program is executed by the processor, the following steps being implemented:
if the quantity of effective pixel points in the first exposure image does not meet the preset condition, acquiring a second exposure time greater than the first exposure time and adjacent to the first exposure time in the exposure time gradient array, performing the second-time exposure on the raw 3D image, and generating the second exposure image.

10. The apparatus for improving the 3D image depth information according to claim 9, wherein when the computer program is executed by the processor, the following steps being implemented:
if the quantity of effective pixel points in the second exposure image does not meet the preset condition, acquiring a third exposure time greater than the second exposure time and adjacent to the second exposure time in the exposure time gradient array, performing third-time exposure on the raw 3D image, and generating the third exposure image until the exposure time reaches the exposure time threshold or the quantity of effective pixel points in the corresponding image generated through exposure meets the preset condition.

11. An unmanned aerial vehicle (UAV), comprising:
a housing;
an arm;
a motor mounted onto the arm;
a propeller comprising a hub and a blade, the hub being connected to a rotating shaft of the motor, when the rotating shaft of the motor rotates, the blade being driven to rotate to produce a force that causes the UAV to move;
a camera mounted onto the housing; and
a processor configured to perform the method for improving 3D image depth information, wherein the method comprises:
acquiring a raw 3D image, performing first-time exposure on the raw 3D image, and generating a first exposure image;
acquiring an effective pixel point in the first exposure image, and if a quantity of effective pixel points meets a preset condition, extracting the effective pixel point in the first exposure image; otherwise, performing second-time exposure on the raw 3D image, and generating a second exposure image; and
if a quantity of effective pixel points in the second exposure image meets a preset condition, extracting the effective pixel point in the second exposure image; otherwise, continuously performing exposure and generating a corresponding exposure image, determining whether the quantity of effective pixel points of the exposure image meets the preset condition until an exposure time reaches an exposure time threshold or a quantity of effective pixel points in the corresponding exposure image generated through exposure meets the preset condition, and extracting an effective pixel point in the exposure image; and
demarcating and calibrating the effective pixel point, and generating a 3D depth information map.

* * * * *